Figure 5:
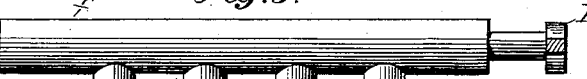

(No Model.) 2 Sheets—Sheet 1.
S. G. CABELL.
Saw Cleaner for Cotton Gins.
No. 238,645. Patented March 8, 1881.
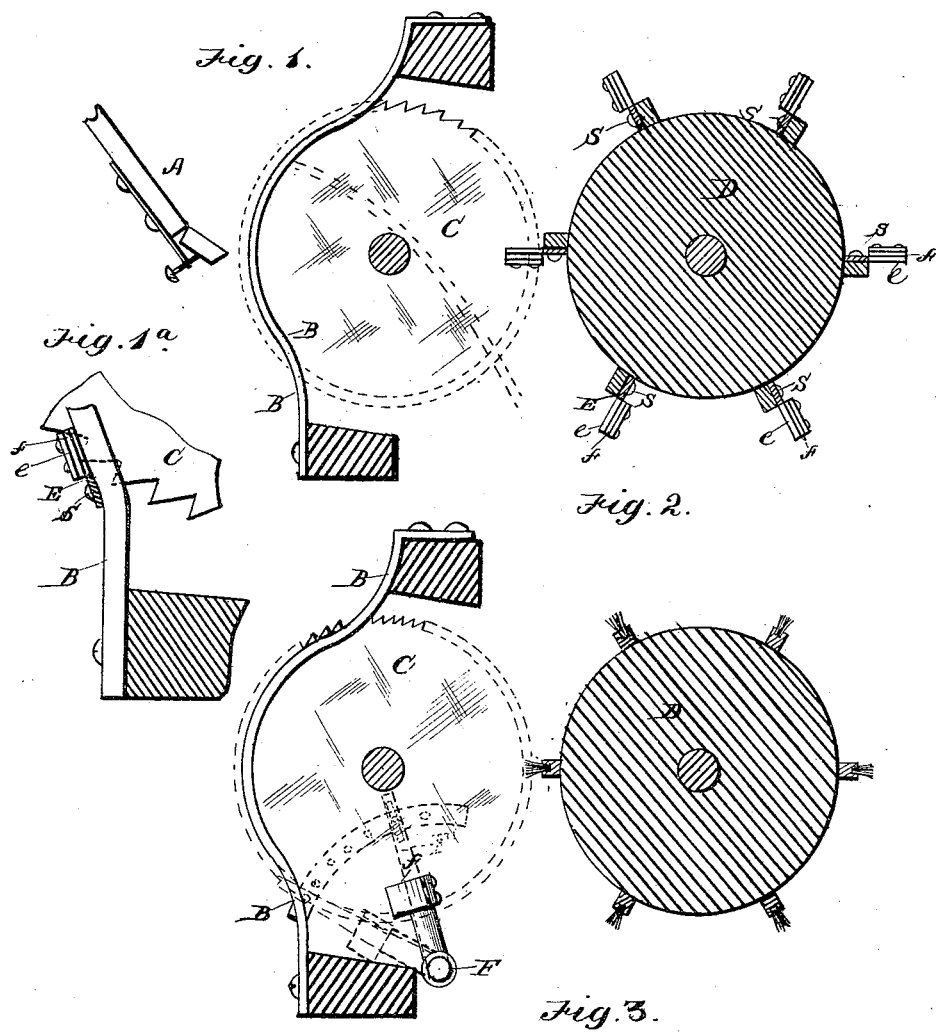
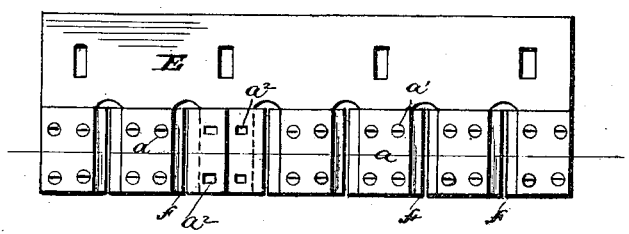
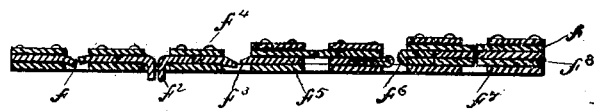
Attest,
W. H. H. Knight
W. Blackstock
Inventor,
Samuel G. Cabell
By Hill & Church
his attys.
N. PETERS, PHOTO-LITHOGRAPHER, WASHINGTON, D. C.

(No Model.) 2 Sheets—Sheet 2.

S. G. CABELL.
Saw Cleaner for Cotton Gins.

No. 238,645. Patented March 8, 1881.

Attest,
W. H. H. Knight
W. Blackstock.

Inventor,
Samuel G. Cabell
By Hill & Church
his attys.

UNITED STATES PATENT OFFICE.

SAMUEL G. CABELL, OF WASHINGTON, DISTRICT OF COLUMBIA, ASSIGNOR TO FLORA B. CABELL, OF SAME PLACE.

SAW-CLEANER FOR COTTON-GINS.

SPECIFICATION forming part of Letters Patent No. 238,645, dated March 8, 1881.

Application filed February 3, 1881. (No model.)

*To all whom it may concern:*

Be it known that I, SAMUEL G. CABELL, of Washington, in the county of Washington and District of Columbia, have invented certain new and useful Improvements in Saw-Cleaners for Cotton-Gins; and I do hereby declare the following to be a full, clear, and exact description of the same, reference being had to the accompanying drawings, forming part of this specification, in which—

Figure 1 represents the invention applied as rotary cleaner; Fig. 2, the same applied as stationary cleaner, in connection with the ordinary revolving lint-removing brush; and Figs. 3 to 20 show different forms or modifications of the invention.

Similar letters of reference in the several figures denote the same parts.

My invention has for its object to provide improved means for keeping clean and free from moisture and gummy substances the saws of cotton-gins, whereby the machine is caused to operate more satisfactorily; and to this end it consists, primarily, in providing a series of fingers or supports between the saws of the gin, and in applying and securing to such fingers or supports strips or pieces of leather, felt, paper, or other like flexible material having continuous cleaning surfaces or edges, in such manner that such continuous cleaning surfaces or edges of said strips or pieces will bear or press closely against the sides of the saws and operate to keep them scraped clean and free from all adherent matter.

It further consists in rendering the flexible pieces adjustable to and from the saws, for the purpose of causing them to bear with the proper amount of pressure against the saws, and also to enable compensation to be made for wear; and it consists, finally, in certain details of construction, which will be hereinafter fully described, and pointed out in the claims.

In the drawings, A represents the hopper of an ordinary gin; B, the slatted or grated side of the hopper through which the series of saws work, and C one of the saws.

D represents the rotating cylinder, to which are applied the brushes or other means employed to strip the cotton from the saws and conduct it away in the usual manner. The cleaning devices which constitute my invention may either be applied to this cylinder D, as represented in Fig. 1, so as to operate both to strip the cotton from the saws and also to clean the latter; or they may constitute a separate attachment, as shown in Fig. 2, in which case the ordinary stripping-brushes are employed on the cylinder; or, again, they may be applied to the bars of the hopper-grate, as shown in Fig. 1$^a$, as may be desired; but wherever they are located their operation upon the saws as cleaners is substantially the same.

In that class of gins in which metal strips or guards extend between the saws from the grate of the hopper downward, as shown in dotted lines, Fig. 1, the cleaners may be applied to such guards.

The fingers or supports which project between the saws and carry the strips or pieces of leather, felt, &c., may consist of flat rigid fingers $e$, formed upon or attached to a longitudinal supporting-plate, E, extending substantially parallel to the saw-shaft, as shown in Figs. 1, 3, 4, 7, 8, 9, 10, 11, 12; or they may be made of metal, of tubular form, and attached to a longitudinal shaft, F, as shown in Figs. 2, 5, 6, 13, 14, 15, 16, 17, and 18.

The pieces or strips of cleaning material are represented in the several figures by the letter $f$. They may consist of leather, felt, paper, rubber, canvas, vulcanized fiber, celluloid, or other flexible fibrous substance, or of thin strips of mica, and various means may be devised for holding them to their supports. In Figs. 3 and 4, for instance, they are shown held by means of clamping-plates $a$ and screws $a'$. The screws preferably pass through slots in the material, as shown at $a^2$, to admit of an adjustment of the material toward and from the saws, and enable it to bear with the proper amount of pressure on the saws, and also to enable compensation to be made for wear. The edges of the material which extend over the edges of the supporting-fingers may continue out straight to the saw, or slightly bent down, as shown at $f'$, or bent down at right angles, as shown at $f^2$; or they may be brought down to a feather edge, as shown at $f^3$. Each clamping-plate may hold two pieces of material edge to edge, as at $f^4$, or superposed one above the other, as at $f^5$. Two thicknesses of material may also be employed, with the edges of both bearing against the saw; or the pieces of material may be folded back on themselves, as at $f^6$, so as to present the bights or folds to the saws. Where damp cotton is to be ginned I have thought it advisable in some cases to secure by the same clamping-plate upper pieces of leather or felt and under pieces of porous absorptive paper, as shown at $f^7$—$f$ representing the leather, and $f^8$ the paper.

Figure 6:
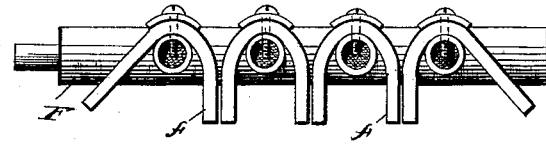

In the modification shown in Figs. 5 and 6 the strips or pieces of material are bent over and secured to the tubular fingers or supports, their elasticity causing them to bear with sufficient pressure against the saws to produce the proper cleaning action. When the strips become worn on their bearing-surfaces they can be adjusted out by inserting a piece of leather or other material between the strips and the fingers.

Figure 7:
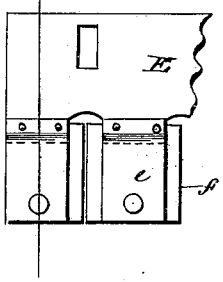
Figure 8:

In Figs. 7 and 8 the clamping-plates are shown made of thin metal, riveted at one end to the fingers, and bent up so as to accommodate the material between them and the fingers. The material is securely held by passing through a pin or fastener and turning its end against the finger, as shown in Fig. 8. This makes a very cheap and effective arrangement.

Figure 9:
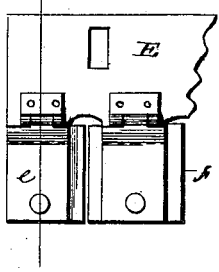
Figure 11:
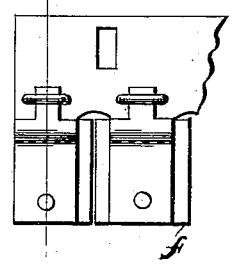
Figure 10:
Figure 12:
Figure 13:
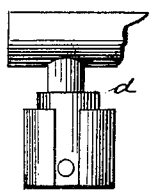

In Figs. 9 and 10 the clamping-plates, instead of being riveted to the plate E, are secured thereto by hinges, while in Figs. 11 and 12 the connection is effected by means of a tang or shank on the clamping-plate and a loop or staple on the plate E.

Figure 15:
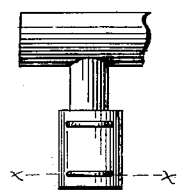
Figure 16:

Figs. 13 to 18 illustrate modifications of the means shown in Figs. 5 and 6 for securing the material to the tubular form of finger. In the form shown in Figs. 13 and 14 a slotted thimble, $d$, is placed upon the tubular finger, and in the slot of such thimble the material is inserted, being held by a screw, $d'$, passing through the thimble and into the finger, as shown. In Figs. 15 and 16 the thimble is dispensed with, and the piece of cleaning material is held directly to the tubular finger by means of wire loops secured by twisting, as shown.

Figure 17:
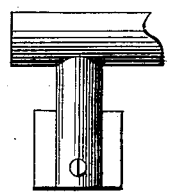
Figure 14:
Figure 18:

Figs. 17 and 18 show an arrangement especially designed to be employed where mica is used as the cleaning material. Here the tubular finger is itself slotted or divided and the sheet of mica $f$ inserted in the slot, together with a thin supporting-plate, $g$, of metal. The metal plate is made narrower than the mica, so as to leave a projecting edge of mica on each side. A screw, $h$, passing down through the finger holds the plates securely in position.

Figure 19:
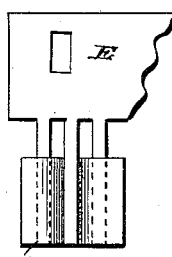
Figure 20:
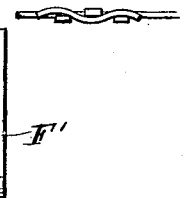

Figs. 19 and 20 show a very simple modification, in which each piece of cleaning material is held by a finger slotted so as to form three prongs.

Numerous other modifications might be suggested; but it is not deemed necessary, as those already shown are sufficient to illustrate fully the main principle of my invention, which consists in so supporting the pieces or strips of flexible material between the saws as that their contact edges or surfaces will act upon the saws uniformly and with equal effect throughout the entire length of said edges or surfaces, instead of unequally and ineffectively, as where pieces of flexible material are caused to project in between the saws from an outer support and are unsupported at all between the saws. As the edges or wearing-surfaces of the pieces of cleaning material become worn the pieces may be adjusted up close to the saws again, or any one or more of them may be removed and new pieces substituted without at all interfering with the others.

Any of the various forms of holding devices may be employed, whether the cleaners are to be mounted on the cylinder D, as in Fig. 1, or on the separate attachment shown in Fig. 2, or upon the ribs of the hopper-grate.

The kind of cleaning material employed is not important, the only requisites being that it be flexible and, preferably, of a fibrous nature, and that it present a continuous edge or bearing-surface to the saws, and that it be adapted to the practical cleaning of the saws.

The shaft F, (shown in Figs. 2, 5, and 6,) to which the cleaner-carrying fingers are attached, is mounted in bearings in the frame of the machine, and is adapted to be rocked back and forth toward and from the saws by means of an arm or lever, F', so as to cause the cleaners to act at the desired point on the saw-blades, or so as to cause them to be thrown entirely out of operation at will. The lever F' is adapted to be locked at any point of its adjustment by any suitable means. The plates E, as applied to the cylinder D, are also made radially adjustable by means of slots in plates E, and securing bolts or screws S playing in such slots, so that the cleaners, held by their fingers, can be made to operate properly on the saws.

Having thus described my invention, I claim as new—

1. The combination, with a cotton-gin saw, of a rigid support extending substantially parallel to the side of the saw, and a cleaner consisting of a piece or strip of leather or like flexible material secured to said rigid support and projecting laterally from it, and presenting a continuous cleaning surface or edge to the side of the saw, substantially as described, for the purpose specified.

2. The combination, with the saws of a cotton-gin, of a series of fingers or supports between the saws, strips or pieces of leather or like flexible material projecting laterally from said supports and presenting continuous clearing surfaces or edges to the sides of the saws, and adjustable clamping means for holding said pieces or strips to their supports, and also for enabling any one or more of them to be applied or removed without disturbing the others, substantially as described, for the purpose specified.

3. The combination, with the saws of a cotton-gin, of a series of fingers or supports between the saws, strips or pieces of leather or like flexible material projecting laterally from said supports and presenting continuous cleaning surfaces or edges to the sides of the saws, and means for adjusting said pieces or strips on their supports toward and from the saws, so as to cause them to bear with more or less pressure, substantially as described, for the purpose specified.

4. The combination, with the saws of a cotton-gin, of an adjustable outer or main support carrying rigid fingers, which project in between the saws, means for locking the outer support in adjusted position, and strips or pieces of leather or like flexible material projecting laterally from the fingers, and having continuous cleaning surfaces or edges, whereby the cleaning strips or pieces can be adjusted to the desired position on the saw-blades and there held, substantially as described.

SAMUEL G. CABELL.

Witnesses:
W. BLACKSTOCK,
M. CHURCH.